US011450456B1

United States Patent
Evans

(10) Patent No.: US 11,450,456 B1
(45) Date of Patent: *Sep. 20, 2022

(54) COAXIAL CABLE AND METHOD FOR FORMING THE CABLE

(71) Applicant: Superior Essex International LP, Atlanta, GA (US)

(72) Inventor: Christopher Robert Evans, Kennesaw, GA (US)

(73) Assignee: Superior Essex International LP, Atlanta, GA (US)

( * ) Notice: Subject to any disclaimer, the term of this patent is extended or adjusted under 35 U.S.C. 154(b) by 394 days.

This patent is subject to a terminal disclaimer.

(21) Appl. No.: 16/777,092

(22) Filed: Jan. 30, 2020

Related U.S. Application Data

(63) Continuation-in-part of application No. 16/142,848, filed on Sep. 26, 2018, now Pat. No. 10,718,918.

(51) Int. Cl.
| | |
|---|---|
| *H01B 11/22* | (2006.01) |
| *G02B 6/44* | (2006.01) |
| *H01B 7/18* | (2006.01) |
| *H01B 11/18* | (2006.01) |

(52) U.S. Cl.
CPC ........... *H01B 11/22* (2013.01); *G02B 6/4413* (2013.01); *G02B 6/4434* (2013.01); *H01B 7/1825* (2013.01); *H01B 11/18* (2013.01); *H01B 11/183* (2013.01); *H01B 11/1869* (2013.01)

(58) Field of Classification Search
CPC ... H01B 7/02; H01B 7/04; H01B 7/06; H01B 7/08; H01B 11/02; H01B 11/04; H01B 11/06
USPC .............. 174/102 R, 36, 108, 109
See application file for complete search history.

(56) References Cited

U.S. PATENT DOCUMENTS

| | | | |
|---|---|---|---|
| 3,980,808 A | 9/1976 | Kikuchi et al. | |
| 5,246,783 A | 9/1993 | Spenadel et al. | |
| 6,518,505 B1* | 2/2003 | Matsui | H01B 1/026 174/126.1 |
| 6,714,707 B2 | 3/2004 | Rossi et al. | |
| 9,799,422 B2* | 10/2017 | Mayama | H01B 11/1895 |
| 10,020,095 B1* | 7/2018 | Huang | H01B 11/1878 |
| 2002/0027014 A1 | 3/2002 | Mukoyama et al. | |
| 2006/0118322 A1 | 6/2006 | Wiekhorst et al. | |
| 2007/0187134 A1* | 8/2007 | Detian | H01B 11/20 174/126.1 |
| 2010/0212933 A1* | 8/2010 | Hayashishita | H01B 3/445 174/113 C |
| 2016/0147028 A1 | 5/2016 | Kumar et al. | |
| 2016/0148725 A1 | 5/2016 | Flory et al. | |
| 2016/0353617 A1 | 12/2016 | Gimblet et al. | |
| 2016/0356974 A1 | 12/2016 | Bringuier et al. | |

(Continued)

OTHER PUBLICATIONS

Office Action, dated Feb. 27, 2019, for U.S. Appl. No. 16/142,844.

(Continued)

*Primary Examiner* — William H. Mayo, III

(57) ABSTRACT

A cable may include an inner conductor and an outer conductor coaxially arranged around the inner conductor. A dielectric strength member may be positioned between the inner and outer conductors. The dielectric strength member may have a thickness between 0.1 mm and 50 mm and a tensile strength of at least 5,000 MPa. Additionally, a jacket may be formed around the outer conductor.

20 Claims, 5 Drawing Sheets

(56) References Cited

U.S. PATENT DOCUMENTS

2017/0276891 A1 9/2017 Esseghir et al.
2018/0247733 A1 8/2018 Mann
2018/0268961 A1 9/2018 Kim

OTHER PUBLICATIONS

Notice of Allowance, dated Jun. 17, 2019, for U.S. Appl. No. 16/142,844.
Office Action, dated Jan. 8, 2019, for the U.S. Appl. No. 16/142,848.
Office Action, dated Sep. 30, 2019, for the U.S. Appl. No. 16/142,848.
Notice of Allowance, dated Mar. 18, 2020, for U.S. Appl. No. 16/142,848.

* cited by examiner

COAXIAL CABLE AND METHOD FOR FORMING THE CABLE

CROSS-REFERENCE TO RELATED APPLICATION

This application is a continuation-in-part of U.S. Pat. No. 10,718,918, filed Sep. 26, 2018 and entitled "Coaxial Cable and Method for Forming the Cable." This application is also related to U.S. Pat. No. 10,388,430, filed Sep. 26, 2018 and entitled "Hybrid Cable for Use in Aerial Applications." The contents of each of these applications is incorporated herein by reference in its entirety.

TECHNICAL FIELD

Embodiments of the disclosure relate generally to coaxial cables and methods for producing coaxial cables and, more particularly, to coaxial cables that incorporate dielectric strength members between the inner and outer conductors.

BACKGROUND

Coaxial cables typically include an inner conductor and an outer conductor or outer shield that share a geometric axis. A dielectric layer, insulating layer, or spline provides separation between the inner conductor and the outer conductor. Conventional dielectric layers are often formed from solid plastic, foamed plastic, or plastic spacers. However, conventional dielectric layers typically provide relatively little structural support for the coaxial cables. Accordingly, there is as opportunity for improved coaxial cables that incorporate dielectric strength members as a dielectric layer between the inner and outer conductors. Additionally, there is an opportunity for improved coaxial cables that may be utilized in applications in which a cable must support its own load or weight, such as aerial applications.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures. Additionally, the drawings are provided to illustrate example embodiments described herein and are not intended to limit the scope of the disclosure.

DETAILED DESCRIPTION

Figure 1:
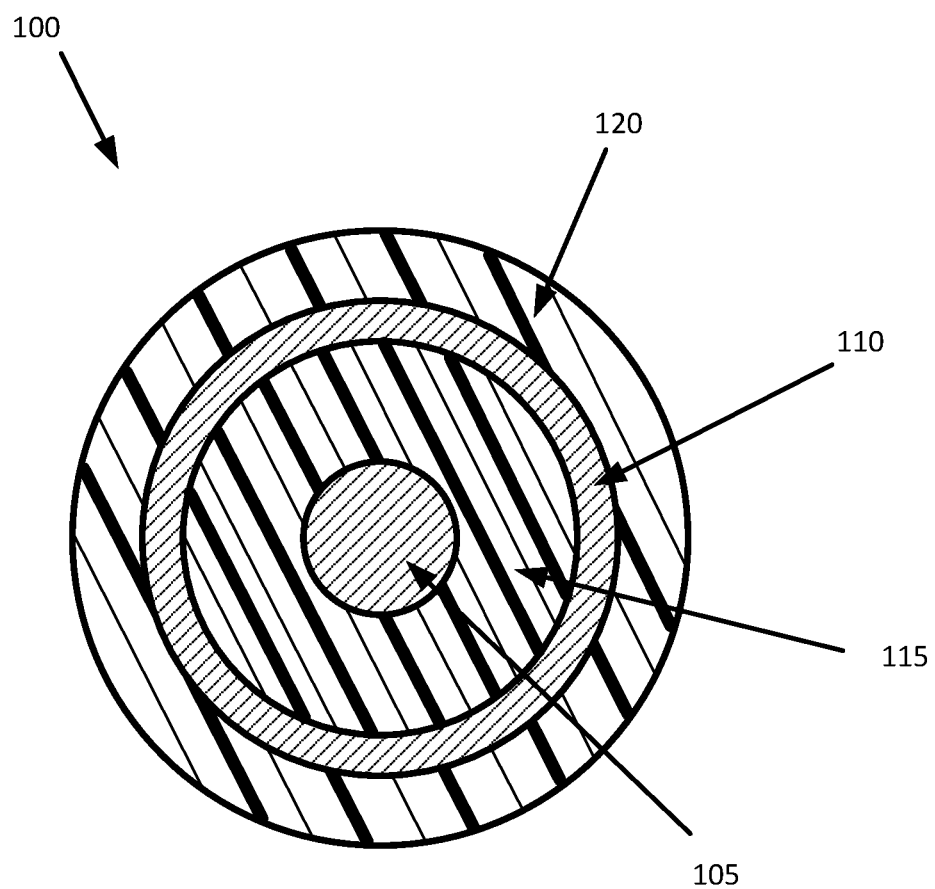
FIG. 1 depicts a cross-sectional view of an example coaxial cable that incorporates a dielectric strength member, according to illustrative embodiments of the disclosure.

Various embodiments of the present disclosure are directed to coaxial cables that incorporate dielectric strength members. A coaxial cable may include an inner conductor and an outer conductor coaxially arranged around the inner conductor. In certain embodiments, the inner and outer conductors may be formed as a balanced pair of conductors. For example, the direct current resistances of the inner and outer conductors may be matched or approximately equal. As a result, the inner and outer conductors may be suitable for use in transmitting power signals. Further, according to an aspect of the disclosure, a dielectric strength member may be positioned between the inner and outer conductors. In other words, the dielectric strength member may be formed around the inner conductor, and the outer conductor may be formed around the dielectric strength member. In certain embodiments, the dielectric strength member may have a tensile strength of at least 5,000 MPa, such as a tensile strength between 5,000 MPa and 500 GPa. The dielectric strength member may also have any suitable thickness, such as a thickness between 0.1 mm and 50 mm. The dielectric strength member may provide structural and/or anti-buckling support for the coaxial cable. For example, the dielectric strength member may permit the coaxial cable to be implemented in aerial or suspended applications in which the cable must be capable of supporting its own weight or load. In certain embodiments, the dielectric strength member may permit the coaxial cable to be incorporated into a hybrid cable, and the coaxial cable may provide structural and/or anti-buckling support for the hybrid cable.

A dielectric strength member may be formed from a wide variety of materials and/or combinations of materials. For example, a dielectric strength member may be formed from glass reinforced plastic ("GRP") or basalt fiber. In certain embodiments, the dielectric strength member may be formed to have a longitudinally extending cavity, and the inner conductor of a conductive component may be positioned within the cavity. Additionally, in certain embodiments, the dielectric strength member may be formed as a solid layer between the inner and outer conductors. In other embodiments, the dielectric strength member may be formed with spaces between a plurality of sections or components of the dielectric strength member. For example, the dielectric strength member may be formed in a plurality of sections that are radially spaced around an outer circumference of the inner conductor. In yet other embodiments, the dielectric strength member may include one or more components that spiral around the inner conductor along a longitudinal direction. As desired, spaces may be formed between adjacent wrappings of one or more spiraling components. A dielectric strength layer may be formed with a wide variety of other suitable configurations.

Other embodiments of the disclosure are directed to methods for forming coaxial cables. In one example method, an inner conductor may be provided. A dielectric strength member may then be formed around the inner conductor. For example, strength fibers (e.g., glass fibers, etc.) may be twisted or wrapped around, positioned adjacent to, or otherwise positioned in proximity to the inner conductor. A suitable resin material, such as a polymer matrix resin, may then be applied to the strength fibers in order to form the dielectric strength member around the inner conductor. An outer conductor may then be formed or positioned around the dielectric strength member. Insulation or a jacket layer may then be formed around the outer conductor.

Embodiments of the disclosure now will be described more fully hereinafter with reference to the accompanying drawings, in which certain embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIG. 1 depicts a cross-sectional view of an example coaxial cable 100, according to an illustrative embodiment of the disclosure. The coaxial cable 100 may include an inner conductor 105, an outer conductor 110, and a dielectric strength member 115 positioned between the inner and outer conductors 105, 110. The dielectric strength member 115 may provide structural and/or anti-buckling support for the coaxial cable 100. For example, the dielectric strength member 115 may have a tensile strength of at least approximately 5,000 MPa. Additionally, a jacket 120 or insulation layer may be formed around the outer conductor 110. Each of the components of the coaxial cable 100 are described in greater detail below.

The coaxial cable 100 may be suitable for use in a wide variety of desired applications. For example, the coaxial cable 100 may be suitable for use in applications in which the cable 100 is required to support its own load or weight, such as suspended or aerial applications. Additionally, the coaxial cable 100 may be utilized to transmit a wide variety of suitable signals, such as power and/or communications signals. In certain embodiments, the coaxial cable 100 may be suitable for use as a subcomponent in other cables, such as hybrid cables that include a combination of different types of transmission media. As one example, the coaxial cable 100 or a plurality of coaxially cables may be incorporated into a hybrid cable that additionally includes one or more optical fibers. In addition to being suitable for transmitting power and/or communications signals, the coaxial cable(s) may provide structural and/or anti-buckling support for the hybrid cable. As a result, a hybrid cable may be suitable for use in applications in which the hybrid cable must support its own load, such as suspended or aerial applications.

With reference to the cable 100 of FIG. 1, the inner conductor 105 and the outer conductor 110 may be positioned or arranged in a coaxial configuration having a common axis that extends along a longitudinal direction of the cable 100. The inner conductor 105 may be formed from any suitable electrically conductive material, such as copper, aluminum, silver, annealed copper, gold, a conductive alloy, conductive composite materials, carbon nanotubes, etc. Indeed, suitable electrically conductive materials may include any material having an electrical resistivity of less than approximately $1 \times 10^{-7}$ ohm meters at approximately 20° C., such as an electrical resistivity of less than approximately $3 \times 10^{-8}$ ohm meters at approximately 20° C. Additionally, the inner conductor 105 may have any suitable diameter, gauge, cross-sectional area, and/or other dimensions. In certain embodiments, the inner conductor 105 may be sized in order to facilitate transmission of a desired power signal via the cable 100. Further, the inner conductor 105 may be formed as either a solid conductor or as a conductor that includes a plurality of conductive strands that are twisted together.

The outer conductor 110 may also be formed from any suitable electrically conductive material, such as copper, aluminum, silver, annealed copper, gold, a conductive alloy, conductive composite materials, carbon nanotubes, etc. Indeed, suitable electrically conductive materials may include any material having an electrical resistivity of less than approximately $1 \times 10^{-7}$ ohm meters at approximately 20° C., such as an electrical resistivity of less than approximately $3 \times 10^{-8}$ ohm meters at approximately 20° C. The outer conductor 110 may also be formed with a wide variety of suitable dimensions, such as any suitable thickness, cross-sectional area, etc.

A wide variety of suitable techniques and/or processes may be utilized to form an outer conductor 110 as desired in various embodiments. In certain embodiments, the outer conductor 110 may be formed as a foil that is wrapped or otherwise positioned around the inner conductor 110 and the dielectric strength member 115. In other embodiments, a plurality of layers of electrically conductive material (e.g., stacked layers of metallic foil, etc.) may be utilized to form the outer conductor 110. In yet other embodiments, electrically conductive material may be pressed, bent, cut, or otherwise mechanically shaped in order to form an outer conductor 110 that can be coaxially arranged around the inner conductor 105.

In other embodiments, a plurality of electrically conductive strands (e.g., metallic strands, etc.) may be utilized to form the outer conductor 110. For example, one or more rings of electrically conductive strands or separate conductive components may be arranged or positioned around the inner conductor 105 and the dielectric strength member 115 in order to form the outer conductor 110. In yet other embodiments, electrically conductive strands (e.g., metallic strands, etc.) may be combined either together or optionally with strands of other material in order to form a longitudinally continuous braided layer that may be utilized as the outer conductor 110. In yet other embodiments, one or more electrically conductive layers (e.g., a metallic foil, metallic ink or paid, liquid metal, etc.) may be combined with one or more base or dielectric layers in order to form an outer conductor 110 that may be coaxially arranged around the inner conductor 105. Other suitable outer conductor constructions may be utilized as desired in other embodiments.

Additionally, the outer conductor 110 may be formed with a wide variety of suitable dimensions, such as any suitable thickness, and/or cross-sectional area. In certain embodiments, one or more dimensions of the outer conductor 110 may be selected such that the outer conductor 110 has a direct current resistance that is matched or approximately equal to that of the inner conductor 105. Additionally, one or more dimensions of the outer conductor 110 may be based at least in part upon the materials utilized to form the outer conductor 110 such that a desired DC resistance and/or power transmission capability may be attained.

Further, a wide variety of suitable separation distances, spacings, or gaps may be present between the inner conductor 105 and the outer conductor. For example, a spacing between approximately 0.1 mm and 50 mm may be present between the inner and outer conductors 105, 100. In various embodiments, the separation distance between the inner and outer conductors 105, 110 may be approximately 0.1, 0.2, 0.25, 0.3, 0.4, 0.5, 0.6, 0.7, 0.75, 0.8, 0.9, 1, 2, 2.5, 3, 4, 5, 6, 7.5, 8, 9, 10, 12, 15, 17, 20, 25, 30, 35, 40, 45, or 50 mm, a distance included in a range between any two of the above values, or a distance included in a range bounded on either a minimum or maximum end by one of the above values (e.g., a distance of 50 mm or less, etc.). The separation distance between the inner and outer conductors 105, 110 may result in a volume or void between the two conductors 105, 110, and the dielectric strength member 115 may occupy a desired percentage of the volume.

In certain embodiments, an inner conductor 105 may be utilized to transmit or propagate a power signal over the cable 100, and the outer conductor 110 may be utilized as a return conductor or a return path for the power signal. In other embodiments, the outer conductor 105 may be utilized to transmit a power signal while the inner conductor 110 serves as a return path. Additionally, in certain embodiments, the inner and outer conductors 105, 110 may be formed as a balanced pair of conductors. For example, the direct current ("DC") resistances and/or the power capacities of the inner and outer conductors 105, 110 may be matched or approximately equal. As desired in other embodiments, the conductors 105, 110 of the cable 100 may be utilized to transmit communications signal as an alternative to or in addition to transmitting power signals.

With continued reference to the cable 100, a dielectric strength member 115 or dielectric strength layer may be positioned between the inner conductor 105 and the outer conductor 110. For example, the dielectric strength member 115 may be formed around the inner conductor 105, and the outer conductor 110 may be formed around the dielectric strength member 115. The dielectric strength member 115 may function as insulation between the two conductors 105, 110. Additionally, the dielectric strength member 115 may provide structural and/or anti-buckling support for the cable 100.

The dielectric strength member 115 may be formed from a wide variety of suitable materials and/or combinations of materials. In certain embodiments, the dielectric strength member 115 may be formed from glass reinforced plastic ("GRP"). In other embodiments, the dielectric strength member may be formed from basalt fiber. Additionally, according to an aspect of the disclosure, the dielectric strength member 115 may have a tensile strength of at least 5,000 MPa. For example, the dielectric strength member 115 may have a tensile strength of at least 10,000 MPa. In various embodiments, the dielectric strength member 115 may have a tensile strength between 5,000 MPa and 500 GPa. For example, the dielectric strength member 115 may have a tensile strength of approximately 5,000 MPa (5 GPa), 7,500 MPa, 8,000 MPa, 9,000 MPa, 10,000 MPa (10 GPa), 12,000 MPa, 15,000 MPa, 18,000 MPa, 20,000 MPa (20 GPa), 25,000 MPa, 30,000 MPa, 35,000 MPa, 40,000 MPa, 50,000 MPa (50 GPa), 75,000 MPa, 100,000 MPa (100 GPa), 150,000 MPa, 200,000 MPa, 250,000 MPa, 300,000 MPa, 350,000 MPa, 400,000 MPa, or 500,000 MPa (500 GPa), a tensile strength included in a range between any two of the above values, or a tensile strength included in a range bounded on a minimum end by one of the above values.

A wide variety of suitable methods and/or techniques may be utilized to form the dielectric strength member 115. In certain embodiments, an inner conductor 105 may be provided, and the dielectric strength member 115 may be formed around the inner conductor 105. For example, a plurality of fibers, such as glass fibers, may be positioned around the inner conductor 105. The fibers may be held in place using a wide variety of suitable techniques, such as adhesives, electrostatic cling, etc. As another example, fibers may be helically wrapped or wound around the inner conductor 105. A polymeric resin, such as a polymer matrix resin, may then be applied on or over the glass fibers in order to form a GRP dielectric strength member 115 around the inner conductor 105. Once formed, the dielectric strength member 115 may include or define a longitudinally extending internal channel or cavity in which the inner conductor 105 is positioned. In other embodiments, the dielectric strength member 115 may be separately formed or molded to include a longitudinally extending cavity. The inner conductor 105 may then be positioned within the cavity. In yet other embodiments, the dielectric strength member 115 may be formed from a plurality of relatively thin layers of GRP material having a combined thickness that corresponds to a desired thickness of the dielectric strength member 115. The relatively thin layers of GRP material may be curled or wrapped around the inner conductor 105 along a longitudinal direction. One example method for forming a dielectric strength member 115 is described in greater detail below with reference to FIG. 5.

The dielectric strength member 115 may also be formed with a wide variety of suitable dimensions, such as any suitable thickness and/or cross-sectional area. In certain embodiments, a thickness and/or other dimensions of the dielectric strength member 115 may be based at least in part on the dimensions of the inner and/or outer conductors 105, 110 and/or a desired separation distance between the two conductors 105, 110. Additionally, in various embodiments, a thickness and/or other dimensions of the dielectric strength member 115 may be based at least in part upon a desired tensile strength for the dielectric strength member 115.

In certain embodiments, the dielectric strength member 115 may have a thickness between approximately 0.1 mm and 50 mm. In various embodiments, the dielectric strength member 115 may have a thickness of approximately 0.1, 0.2, 0.25, 0.3, 0.4, 0.5, 0.6, 0.7, 0.75, 0.8, 0.9, 1, 2, 2.5, 3, 4, 5, 6, 7.5, 8, 9, 10, 12, 15, 17, 20, 25, 30, 35, 40, 45, or 50 mm, a thickness included in a range between any two of the above values, or a thickness included in a range bounded on either a minimum or maximum end by one of the above values (e.g., a thickness of 50 mm or less, etc.). The dielectric strength member 115 may also be formed with any desired number of layers, such as one or a plurality of layers.

Additionally, the dielectric strength member 115 may occupy any desired portion or percentage of the volume between the inner and outer conductors 105, 110. In certain embodiments, the dielectric strength member 115 may occupy between approximately five percent (5.0%) and one hundred percent (100%) of the volume between the inner and outer conductors 105, 110. In various embodiments, the dielectric strength member 115 may occupy approximately 5.0, 7.5, 10.0, 12.5, 15.0, 17.5, 20.0, 25.0, 30.0, 35.0, 40.0, 50.0, 60.0, 70.0, 75.0, 80.0, 90.0, or 100 percent of the volume between the inner and outer conductors 105, 110, a percentage included in a range between any two of the above values, or a percentage included in a range bounded on a minimum end by one of the above values.

In certain embodiments, as illustrated in FIG. 1, a dielectric strength member 115 may be formed as a solid component or as a solid layer between the inner conductor 105 and the outer conductor 115. In other embodiments, as described in greater detail below with reference to FIG. 2, the dielectric strength member 115 may be formed with spaces between a plurality of sections or components of the dielectric strength member 115. For example, the dielectric strength member 115 may be formed in a plurality of sections that are radially spaced around an outer circumference of the inner conductor 105. In yet other embodiments, as described in greater detail below with reference to FIGS. 3A-3B, the dielectric strength member 115 may be formed as a layer that spirals around the inner conductor 105 along a longitudinal direction. As desired, spaces may be formed between adjacent wrappings of the spiral. As yet another example, the dielectric strength member 115 may include a plurality of components that spiral around the inner conductor 105, such as two or more spirals that are longitudinally offset from one another. A wide variety of other configurations may be utilized to form a dielectric strength member that incorporates spaces or gaps between a plurality of sections or components.

With continued reference to the cable 100, a jacket 120 or suitable insulation may be formed around the outer conductor 110. The jacket 120 may provide electrical isolation for the cable 100. For example, if the cable 100 is incorporated into a hybrid cable, the jacket 120 may provide electrical isolation between the cable 100 and one or more adjacent conductive components of the hybrid cable. Additionally, the jacket 120 may provide protection for the internal components of the cable 100. The jacket 120 may include any suitable dielectric materials and/or combination of materials. Examples of suitable dielectric materials include, but are not limited to, one or more polymeric materials, one or more polyolefins (e.g., polyethylene, polypropylene, etc.), one or more fluoropolymers (e.g., fluorinated ethylene propylene ("FEP"), melt processable fluoropolymers, MFA, PFA, ethylene tetrafluoroethylene ("ETFE"), ethylene chlorotrifluoroethylene ("ECTFE"), etc.), one or more polyesters, polyvinyl chloride ("PVC"), one or more flame retardant olefins, a low smoke zero halogen ("LSZH") material, etc.), nylon, polyurethane, neoprene, cholorosulphonated polyethylene, flame retardant PVC, low temperature oil resistant PVC, flame retardant polyurethane, flexible PVC, or a combination of any of the above materials.

In various embodiments, the jacket 120 may be formed from one or multiple layers of insulation material. A layer of insulation may be formed as solid insulation, unfoamed insulation, foamed insulation, or other suitable insulation. As desired, a combination of different types of insulation may be utilized. For example, a foamed insulation layer may be covered with a solid foam skin layer. Additionally, the jacket 120 may be formed with any suitable thickness, inner diameter, outer diameter, and/or other dimensions. As desired in various embodiments, jacket 120 may additionally include a wide variety of other materials (e.g., filler materials, materials compounded or mixed with a base insulation material, etc.), such as smoke suppressant materials, flame retardant materials, etc.

Figure 2:
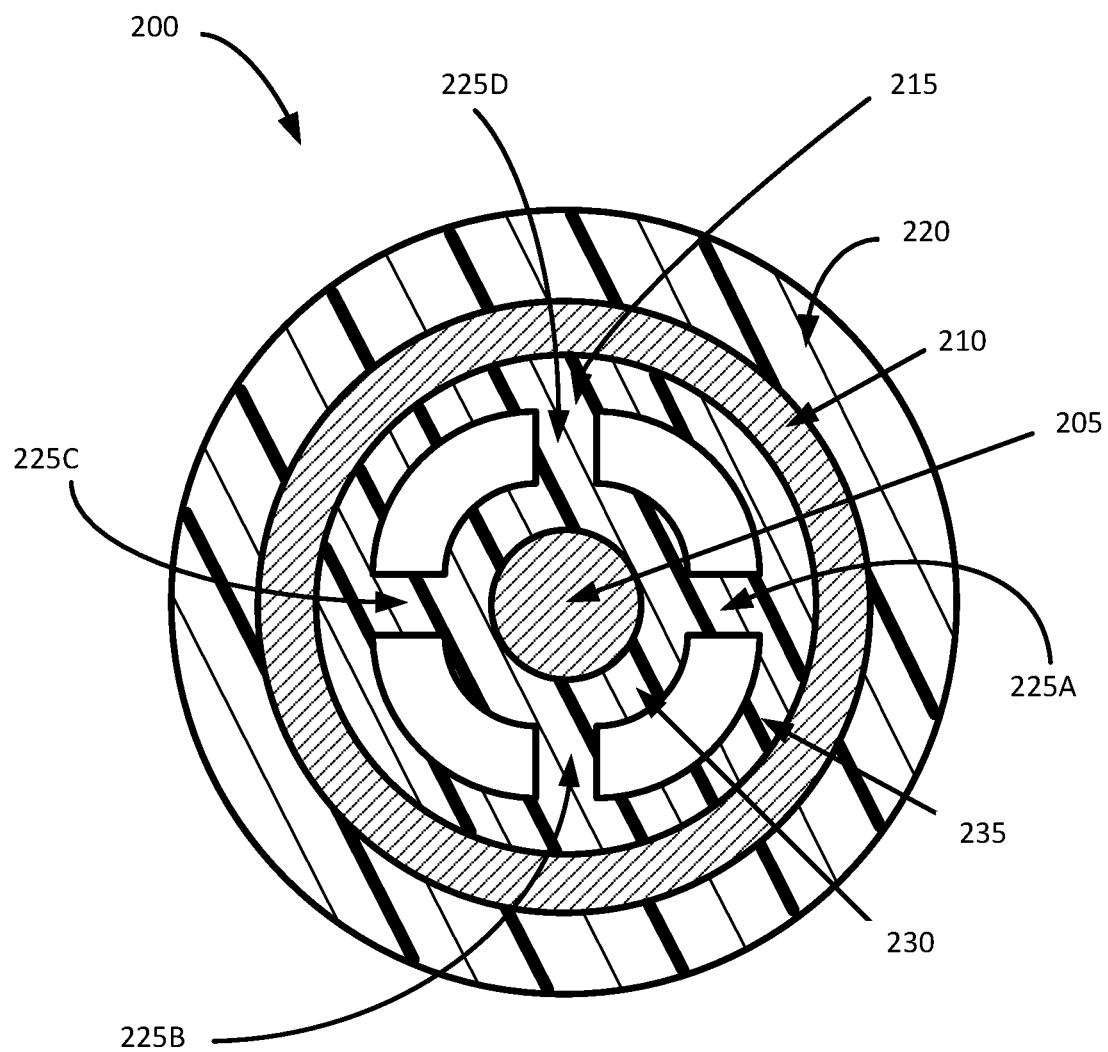
FIG. 2 depicts a cross-sectional view of another example coaxial cable that incorporates a dielectric strength member, according to illustrative embodiments of the disclosure.

FIG. 2 depicts a cross-sectional view of another example coaxial cable 200, according to an illustrative embodiment of the disclosure. Much like the cable 100 of FIG. 1, the cable 200 may include an inner conductor 205, an outer conductor 210, a dielectric strength member 215 positioned between the inner and outer conductors 205, 210, and a jacket 220 formed around the outer conductor 210. Each of these components may be similar to those described above with reference to the cable 100 of FIG. 1.

However, the dielectric strength member 215 of the cable 200 is depicted as including a plurality of sections 225A-D that are radially spaced around an outer circumference of the inner conductor 205. In other words, the dielectric strength member 215 may include a plurality of spokes that extend between the inner conductor 205 and the outer conductor 210. Although four sections 225A-D are depicted in FIG. 2, any suitable number of sections may be incorporated into a dielectric strength member 215 as desired in various embodiments. Additionally, in certain embodiments, the sections 225A-D may be characterized as spokes that are positioned between the two conductors 205, 210.

In certain embodiments, the dielectric strength member 215 may additionally include an inner layer 230 adjacent to the inner conductor 205 and/or an outer layer 235 adjacent to the outer conductor 210. The inner layer 230 and/or outer layer 235 may provide additional strength and/or structural support for the dielectric strength member 215. For example, an inner layer 230 may extend around or substantially around an outer periphery of the inner conductor 205, and the plurality of sections 225A-D may extend from the inner layer 230. As another example, an outer layer 235 may extend around or substantially around an inner circumference of the outer conductor 210. In other embodiments, at least one of an inner layer 230 and/or an outer layer 235 may include one or more sections that each extend partially around an outer periphery or circumference of an adjacent conductor. For example, a layer 230, 235 may include a plurality of components that each extend between at least two adjacent sections 225A-D or spokes. The area between adjacent sections 225A-D or spokes may be filled with any desirable material, such as air, another gas, a filling compound, etc.

Figure 3A:
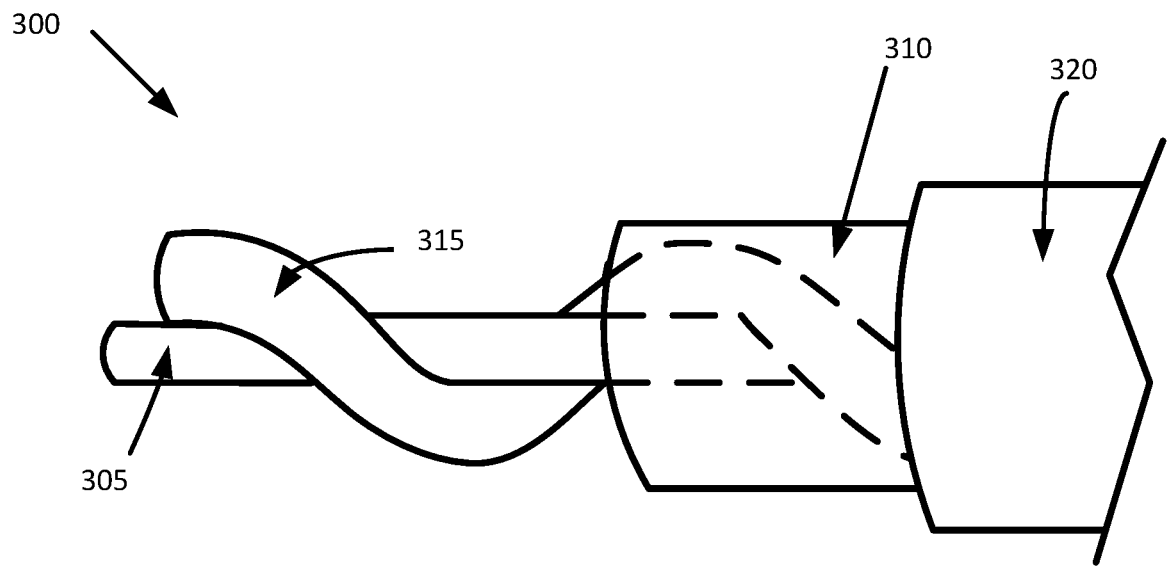
FIGS. 3A-3B depict perspective and cross-sectional views of another example coaxial cable that incorporates a dielectric strength member, according to illustrative embodiments of the disclosure.
Figure 3B:
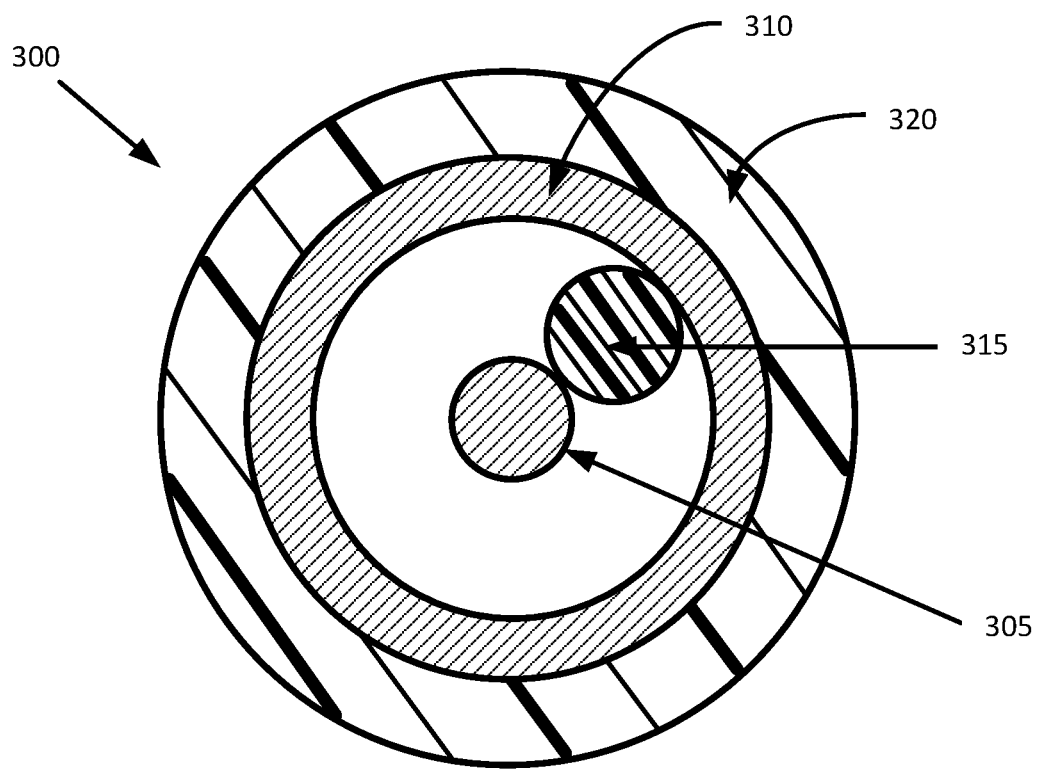

FIG. 3A depicts a perspective view of another example coaxial cable 300, according to an illustrative embodiment of the disclosure. FIG. 3B depicts a cross-section view of the cable 300. Much like the cable 100 of FIG. 1, the cable 300 may include an inner conductor 305, an outer conductor 310, a dielectric strength member 315 positioned between the inner and outer conductors 305, 310, and a jacket 320 formed around the outer conductor 310. Each of these components may be similar to those described above with reference to the cable 100 of FIG. 1.

However, the dielectric strength member 315 of the cable 300 is depicted as a strength member that spirals around the inner conductor 305 along a longitudinal direction. As a result, the material required for the dielectric strength member 315 may be reduced and improved dielectric performance may be attained n the cable 300. In certain embodiments, spaces may be formed between adjacent wrappings or spirals of the strength member 315. As desired, the dielectric strength member 315 may be wrapped, twisted, or spiraled around the inner conductor 305 with any suitable twist lay. Additionally, the dielectric strength member 315 may be formed with a wide variety of suitable thickness, diameters, cross-sectional shapes, and/or other dimensions.

In other embodiments, the dielectric strength member 315 may include a plurality of components that spiral around the inner conductor 305, such as two or more components that are spirally wrapped around the inner conductor 305 and that are longitudinally offset from one another. A wide variety of other configurations may be utilized to form a dielectric strength member that incorporates spaces or gaps between a plurality of sections or components.

The cables 100, 200, 300 illustrated in FIGS. 1-3B are provided by way of example only. Embodiments of the disclosure contemplate a wide variety of other cables and cable constructions. These other cables may include more or less components than the cables 100, 200, 300 illustrated in FIGS. 1-3B. Additionally, certain components may have different dimensions and/or be formed from different materials than the components illustrated in FIGS. 1-3B.

Figure 4:
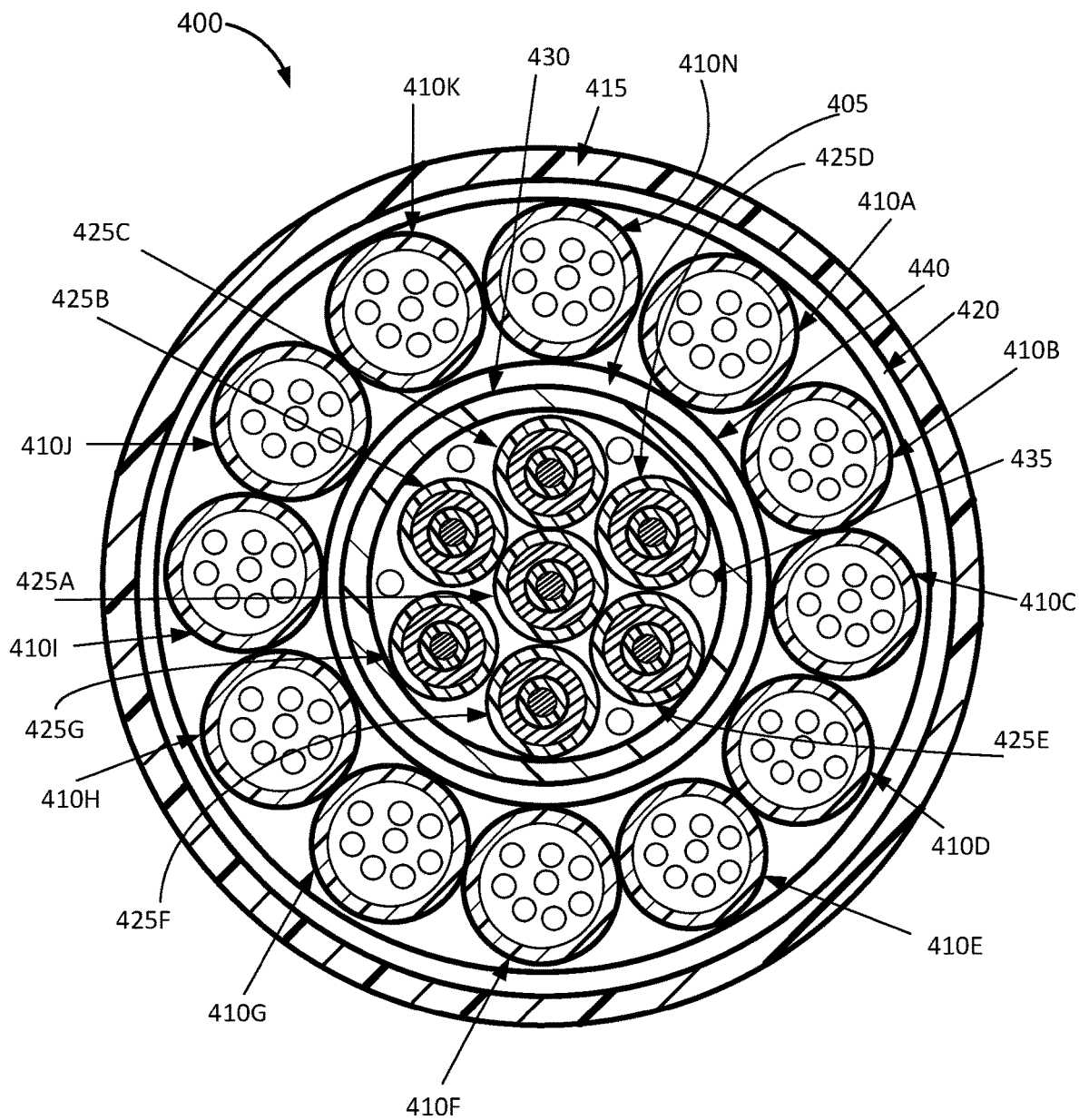
FIG. 4 depicts a cross-section view of an example cable that incorporates coaxial cables with dielectric strength members, according to an illustrative embodiment of the disclosure.

A coaxial cable that incorporates a dielectric strength member, such as any of the cables 100, 200, 300 described above with reference to FIGS. 1-3B, may be incorporated into a larger cable as desired in various embodiments. For example, a coaxial cable may be utilized as a component of a hybrid cable. A wide variety of different types of cables may incorporate one or more coaxial cables with dielectric strength members. FIG. 4 depicts a cross-sectional view of one example hybrid cable 100 that may incorporate a plurality of coaxial cable components having dielectric strength members. As a hybrid cable, the cable 400 may include a plurality of different types of transmission media. For example, the cable 400 may include a combination of metallic conductors (e.g., metallic conductors included in the plurality of coaxial cable components, etc.) and optical fibers. The metallic conductors may be suitable for transmitting electrical, power, and/or data signals, and the optical fibers may be suitable for transmitting relatively high speed data signals. The cable 400 may also be suitable for use in a wide variety of applications. For example, the cable 400 may be suitable for use in applications in which the cable 400 is required to support its own load or weight, such as aerial and/or suspended applications.

As illustrated in FIG. 4, the cable 400 may include a central strength member ("CSM") 405 or a core component, and a plurality of optical fiber components, such as a plurality of buffer tubes 410A-N, formed or positioned around the CSM 405. An outer jacket 415 may then enclose the core component 405, the buffer tubes 410A-N, and other internal components of the cable 400. In certain embodiments, one or more suitable outer layers 420 (e.g., water blocking layers, strength layers, etc.) may be formed between the buffer tubes 410A-N and the outer jacket 415. Each of these components, as well as additional components that may optionally be incorporated into the cable 400, are described in greater detail below.

The CSM 405 may be formed as a central component of the cable 400. The CSM 405 may provide strength and structural support for the cable 400 and the other components of the cable 400. For example, the CSM 405 may provide desired tensile and/or compressive strength that supports the axial load of cable 400 and assists in preventing or limiting attenuation within the optical fibers housed within the buffer tubes 410A-N. In certain embodiments, the CSM 405 may also assist the cable 400 in resisting thermal expansion and contraction. According to an aspect of the disclosure, the CSM 405 may include a plurality of coaxial cable components 425A-G. Any number of coaxial cable components 425A-G may be incorporated into a CSM 405 as desired in various embodiments. For example, the CSM 405 may include between approximately four and approximately fifty coaxial cable components 425A-G. Other suitable numbers of coaxial cable components 425A-G may be utilized as desired. In various embodiments, the CSM 405 may include 4, 5, 6, 8, 10, 12, 15, 20, 25, 30, 35, 40, 45, or 50 coaxial cable components 425A-G, a number of coaxial cable components 425A-G included in a range between any two of the above values, or a number of coaxial cable components 425A-G included in a range bounded on either a minimum or maximum end by one of the above values.

In certain embodiments, the plurality of coaxial cable components 425A-G may be twisted or stranded together. For example, the plurality of coaxial cable components 425A-G may be helically twisted or stranded together along a longitudinal direction. As another example, the plurality of coaxial cable components 425A-G may be S-Z stranded together along a longitudinal direction. As desired in certain embodiments, one or more additional components may be twisted or stranded with the coaxial cable components 425A-G in the CSM 405. In certain embodiments, one or more strength yarns or other suitable strength members may be twisted and/or stranded with the plurality of coaxial cable components 425A-G. For example, one or more strength members (e.g., strength yarns, etc.) may be positioned within the interstices between coaxial cable components 425A-G and/or around an outer periphery of the plurality of coaxial cable components 425A-G (e.g., between the coaxial cable components 425A-G and an outer wrap 430).

Each of the coaxial cable components 425A-G may be a component that includes an inner conductor, an outer conductor, and a dielectric strength member positioned between the two conductors. For example, each of the coaxial cable components 425A-G may be similar to one of the coaxial cables 100, 200, 300 described above with reference to FIGS. 1-3B. The dielectric strength members incorporated into the coaxial cable components 425A-G may provide structural and/or anti-buckling support for the cable 400. Additionally, as a result of incorporating coaxial cable components 425A-G into the CSM 405, it may be possible to reduce the overall dimensions of the cable 400 relative to conventional hybrid cables, such as conventional hybrid cables intended for use in aerial applications. In contrast, conventional hybrid cables (e.g., conventional cables that incorporate a plurality of twisted pairs, etc.) may be required to include a greater number of strength members (e.g., strength yarns, etc.) outside of the twisted pairs or other conductive components.

In certain embodiments, one or more suitable outer wraps 430 or layers may be formed around the plurality of coaxial cable components 425A-G. For example, one or more suitable longitudinally extending wraps may be wrapped or positioned around the plurality of coaxial cable components 425A-G. An outer wrap 430 may assist in maintaining the positions of the coaxial cable components 425A-G and/or holding the twisted coaxial cable components 425A-G together. In certain embodiments, the outer wrap 430 may also assist in limiting the migration of any other internal components of the CSM 405, such as any internal strength yarns, etc.

In certain embodiments, the outer wrap 430 may be formed as a jacket layer, such as an extruded jacket layer. As such, the outer wrap 430 may be formed from a wide variety of suitable materials, such as a polymeric material, polyvinyl chloride ("PVC"), polyurethane, one or more polymers, a fluoropolymer, polyethylene, medium density polyethylene ("MDPE"), neoprene, chlorosulfonated polyethylene, polyvinylidene fluoride ("PVDF"), polypropylene, modified ethylene-chlorotrifluoroethylene, fluorinated ethylene propylene ("FEP"), ultraviolet resistant PVC, flame retardant PVC, low temperature oil resistant PVC, polyolefin, flame retardant polyurethane, flexible PVC, low smoke zero halogen ("LSZH") material, plastic, rubber, acrylic, or some other appropriate material known in the art, or a combination of suitable materials. As desired, the outer wrap 430 may also include flame retardant materials, smoke suppressant materials, and/or other suitable additives. Additionally, the outer wrap 430 may include a single layer or, alternatively, multiple layers of material (i.e., multiple layers of the same material, multiple layers of different materials, etc.).

In other embodiments, the outer wrap 430 may be formed as one or more binder threads that may be helically or contra helically wrapped around the plurality of coaxial cable components 425A-G. In yet other embodiments, the outer wrap 430 may be a single or multi-layer wrap that is longitudinally curled around the coaxial cable components 425A-G. For example, the outer wrap 430 may be formed as a suitable single or multi-layer tape. As desired, a tape may be bonded, adhered, ultrasonic welded, or otherwise affixed to itself (e.g., affixed with mechanical fasteners, etc.) after it is wrapped or curled around the coaxial cable components 425A-G. In other embodiments, a tape may be helically twisted around the coaxial cable components 425A-G. As desired, adjacent helical wrappings may overlap one another along a longitudinal length such that the coaxial cable components 425A-G are enclosed.

An outer wrap 430 that is formed as a tape may include a wide variety of suitable materials and/or combinations of materials. For example, a tape may include one or more polymeric materials, one or more polyolefins (e.g., polyethylene, polypropylene, etc.), one or more fluoropolymers (e.g., fluorinated ethylene propylene ("FEP"), one or more polyesters, polyethylene-terephthalate, mylar, or a combination of any of the above materials. Additionally, a tape may include any number of suitable layers. As desired, water blocking, flame retardant, and/or other layers and/or materials may be incorporated into a tape.

Additionally, an outer wrap 430 may be formed with a wide variety of suitable dimensions as desired in various embodiments. For example, the outer wrap 430 may be formed with any suitable thickness, inner diameter, outer diameter, and/or width (e.g., for tapes, etc.). In certain embodiments, a width may be selected such that a tape wrap 430 may be longitudinally curled around the coaxial cable components 425A-G in order to enclose or surround the coaxial cable components 425A-G.

Regardless of the construction utilized to form an outer wrap 430, in certain embodiments, the outer wrap 430 may be formed from all dielectric materials. In other embodiments, the outer wrap 430 may incorporate shielding material, such as electrically conductive shielding material. For example, the outer wrap 430 may include a layer of electrically conductive material formed on a dielectric layer or between two dielectric layers. In other embodiments, the outer wrap 430 may include water blocking materials. Indeed, the outer wrap 430 may include any suitable number of layers, and each layer may be formed from a wide variety of suitable materials.

In certain embodiments, one or more strength members 435 may be incorporated into the CSM 405 (e.g., under or within the outer wrap 430). For example, a plurality of strength yarns may be incorporated into the CSM 405. Strength yarns may be relatively flexible and/or relatively light weight strength members. A wide variety of suitable strength yarns may be utilized as desired including, but not limited to, aramid yarns or aramid fibers (e.g., meta-aramid yarns, para-aramid yarns, etc.), Spectra® fiber manufactured and sold by Honeywell International Inc., Technora® fiber manufactured and sold by Teijin Aramid BV, basalt fiber, ultra-high-molecular weight polyethylene ("UHMWPE"), fiberglass yarns, etc.

The strength members 435 may be positioned in a wide variety of locations within the CSM 405. For example, the strength members 435 may be positioned in the interstices between the coaxial cable components 425A-G and/or other internal components. The strength members 435 may also be positioned between the coaxial cable components 425A-G and an inner surface of the outer wrap 430. In certain embodiments, the strength members 435 may extend in a longitudinal direction parallel to other internal components of the CSM 405, such as the coaxial cable components 425A-G. In other words, the strength members 435 may extend approximately parallel to a longitudinal length of the cable 400. In other embodiments, the strength members 435 or subsets of the strength members may be helically twisted with, S-Z stranded with, and/or wrapped around one or more components of the CSM 405.

In certain embodiments, the CSM 405 may be formed as a "dry" component that does not include any filling compound. In other embodiments, a suitable filling compound may also be incorporated into the cable CSM 405, for example, within an outer wrap 430. A wide variety of suitable filling compounds may be utilized as desired. A filling compound may provide mechanical protection (e.g., cushioning, etc.) and water penetration protection or water blocking to the coaxial cable components 425A-G.

Additionally, in certain embodiments, a strength layer 440 may optionally be formed around the CSM 405 and/or incorporated into an outer wrap 430. For example, one or more strength yarns or other strength members may be wrapped or otherwise positioned around the CSM 405. A wide variety of suitable strength yarns may be utilized as desired including, but not limited to, aramid yarns or aramid fibers (e.g., meta-aramid yarns, para-aramid yarns, etc.), Spectra® fiber manufactured and sold by Honeywell International Inc., Technora® fiber manufactured and sold by Teijin Aramid BV, basalt fiber, ultra-high-molecular weight polyethylene ("UHMWPE"), fiberglass yarns, etc. Other suitable strength members may be utilized as desired in other embodiments.

With continued reference to FIG. 4, the cable 400 may include a plurality of optical fiber components positioned around the CSM 405. For example, in certain embodiments, a plurality of buffer tubes 410A-N may be positioned around the CSM 405. Each buffer tube (generally referred to as buffer tube 410) may be a suitable sheath configured to house one or more optical fibers. In certain embodiments, each buffer tube 410 may be formed as a loose tube. In other words, the optical fibers may be loosely positioned within the buffer tube 410. As desired, a plurality of optical fibers may be arranged into one or more suitable bundles or groupings. In other embodiments, a plurality of optical fibers may be incorporated into one or more ribbons and/or a ribbon stack.

The buffer tube 410 may be formed from any suitable materials or combinations of materials. Examples of suitable materials include, but are not limited to, various polymers or polymeric materials, acrylate or acrylics (e.g., acrylic elastomers, etc.), polyvinyl chloride ("PVC"), polyurethane, a fluoropolymer, polyethylene, neoprene, polyvinylidene fluoride ("PVDF"), polybutylene terephthalate ("PBT"), ethylene, plastic, or other appropriate materials or combinations of suitable materials. Additionally, the buffer tube 410 may be formed as either a single layer or a multiple layer buffer tube. In the event that multiple layers are utilized, the layers may all be formed from the same material(s) or, alternatively, at least two layers may be formed from different materials or combinations of materials. For example, at least two layers may be formed from different polymeric resins. As another example, a flame retarding or other suitable additive may be incorporated into a first layer but not into a second layer. Further, the buffer tube 410 may have any suitable inner and/or outer diameters as desired in various applications. For example, the buffer tube 410 may be appropriately sized to house a desired number of optical fibers and/or any other components incorporated into the buffer tube 410.

Any suitable number of buffer tubes 410A-N may be incorporated into the cable 400 as desired in various embodiments. In certain embodiments, a number of utilized buffer tubes 410A-N may be based at least in part upon the size of the CSM 405 and/or the size of the buffer tubes. For example, a desired number of buffer tubes may be utilized in order to result in the cable 400 having a desired cross-sectional shape, such as a circular shape. In certain embodiments, the buffer tubes 410A-N may be helically wrapped around the CSM 405 with any suitable twist lay. In other embodiments, the buffer tubes 410A-N may be S-Z stranded around the CSM 405. In yet other embodiments, the buffer tubes 410A-N may longitudinally extend parallel to the CSM 405.

Additionally, in certain embodiments, the plurality of buffer tubes 410A-N may be positioned in one or more rings around the CSM 405. FIG. 4 illustrates an example cable 400 in which the plurality of buffer tubes 410A-N are positioned in a single ring around the CSM 405. In other embodiments, a plurality of rings of buffer tubes may be positioned around the CSM 405. Further, even if the plurality of buffer tubes 410A-N are helically twisted or S-Z stranded, in certain embodiments, the CSM 405 may be surrounded by one or more rings of buffer tubes 410A-N at any given cross-sectional location along a longitudinal length of the cable 400. In other words, the one or more rings of buffer tubes 410A-N may surround the CSM 405 at any given cross-sectional location along the longitudinal length.

As desired in various embodiments, one or more spacers, fillers, or other components may be utilized in place of one or more of the buffer tubes 410A-N. Alternatively, one or more empty buffer tubes may be utilized. Spacers, fillers, and/or empty buffer tubes may be utilized to provide the cable 400 with a desired overall cross-sectional shape or geometry.

Any suitable number of optical fibers may be housed within each buffer tube 410. Further, in certain embodiments, each of the plurality of buffer tubes 410A-N may house the same number of optical fibers. In other embodiments, at least two of the plurality of buffer tubes may house a different number of optical fibers. Each optical fiber may be a single mode fiber, multi-mode fiber, pure-mode fiber, polarization-maintaining fiber, multi-core fiber, or some other optical waveguide that carries data optically. Additionally, each optical fiber may be configured to carry data at any desired wavelength (e.g., 1310 nm, 1550 nm, etc.) and/or at any desired transmission rate or data rate. The optical fibers may also include any suitable composition and/or may be formed from a wide variety of suitable materials capable of forming an optical transmission media, such as glass, a glassy substance, a silica material, a plastic material, or any other suitable material or combination of materials. Each optical fiber may also have any suitable cross-sectional diameter or thickness. In certain embodiments, an optical fiber may include a core that is surrounded by a cladding. Additionally, one or more suitable coatings may surround the cladding.

As desired, a wide variety of other components may optionally be incorporated into a buffer tube 410 included, but not limited to, a water blocking tape, one or more strength yarns, a dry insert (e.g., for buffer tubes with no filling compound, etc.). In certain embodiments, one or more of the plurality of buffer tubes 410A-N may be filled with a suitable filling compound. For example, a filling compound may be positioned in the interstitial spaces between the optical fibers and/or in the interstitial spaces between the optical fibers and the inner wall of the buffer tube 410 (or any wrap formed around the optical fibers).

Although the cable 400 is illustrated as including loose buffer tubes 410A-N as optical fiber components, in other embodiments, the cable 400 may additionally or alternatively include other types of optical fiber components. For example, in certain embodiments, the cable 400 may include a plurality of microtubes formed around the CSM 405. A microtube may have an inner diameter that is sized to allow housed optical fibers to move relative to one another while preventing the optical fibers from crossing over or overlapping one another. In other words, the microtube may permit the optical fibers to flex or move as the cable is flexed or bent while simultaneously maintaining the position of each optical fiber relative to the other optical fibers. In certain embodiments, an inner diameter of the microtube may be determined based at least in part on the number of optical fibers to be positioned within the microtube, the outer diameters of the optical fibers, and/or the dimensions of any other internal components of the microtubes. As a result of using one or more microtubes, it may be possible to reduce or minimize the diameter of the cable 400 relative to cables that incorporate loose buffer tubes. In yet other embodiments, the cable 400 may include a plurality of tight buffered optical fibers positioned around the CSM 405. A tight buffer may be formed from any suitable material and/or combinations of materials and/or with any suitable thickness. In yet other embodiments, the cable 400 may include a combination of different types of fiber components. As set forth above, fiber components may be incorporated into any number of rings and/or other groupings positioned around the CSM 405.

With continued reference to FIG. 4, one or more optional outer layers 420 may be positioned between the plurality of buffer tubes 410A-N and the outer jacket 415. For example, a water blocking tape may be wrapped or positioned around the plurality of buffer tubes 410A-N. The water blocking tape may be formed from a wide variety of suitable materials and/or combinations of materials. For example, the water blocking tape may be formed as a polymer tape that includes superabsorbent powder ("SAP") or other suitable water absorbing and/or water blocking materials formed thereon or positioned between two polymeric layers. In other embodiments, one or more water swellable yarns may be wrapped or partially wrapped around the plurality of buffer tubes 410A-N and/or otherwise incorporated into the cable 400. As desired, water swellable and/or water blocking components may be provided in a continuous or discontinuous manner along a longitudinal length of the cable 400. Additionally or alternatively, water blocking material (e.g., water blocking dams) may be intermittently incorporated into a cable core.

In other embodiments, the one or more outer layers 420 may include a strength layer. For example, one or more strength yarns or other strength members may be wrapped around the plurality of buffer tubes 410A-N and any intervening layers (e.g., a water blocking tape, etc.). A wide variety of suitable strength yarns may be utilized as desired including, but not limited to, aramid yarns or aramid fibers (e.g., meta-aramid yarns, para-aramid yarns, etc.), Spectra® fiber manufactured and sold by Honeywell International Inc., Technora® fiber manufactured and sold by Teijin Aramid BV, basalt fiber, ultra-high-molecular weight polyethylene ("UHMWPE"), fiberglass yarns, etc. The outer layer(s) 420 may include a wide variety of other layers as desired, such as a flame retardant layer, etc.

As desired in various embodiments, the cable 400 may also include a suitable armor layer that provides mechanical protection for the cable 400. A wide variety of suitable types of armor layers may be utilized. In certain embodiments, the armor layer may be formed as a metallic armor layer, such as a corrugated steel armor layer. For example, a metallic tape (e.g., a steel tape, etc.) may be formed so as to interlock with itself and/or may be corrugated. In other embodiments, the armor layer may be formed as a dielectric armor layer from one or more dielectric or non-conductive materials, such as fiberglass, glass, epoxy, polymeric materials, etc. As desired, the armor layer may be coated with a polymer to promote adhesion, bonding, or a selected level of friction with the interior surface of the cable jacket 415. The armor layer may also be formed with a wide variety of suitable dimensions (e.g., any suitable thickness, etc.) and/or with any desired number and/or sizes of corrugations.

The outer jacket 415 may define an outer periphery of the cable 400. The jacket 415 may enclose the internal components of the cable 400, seal the cable 400 from the environment, and provide strength and structural support. The jacket 415 may be formed from a wide variety of suitable materials, such as a polymeric material, polyvinyl chloride ("PVC"), polyurethane, one or more polymers, a fluoropolymer, polyethylene, medium density polyethylene ("MDPE"), neoprene, chlorosulfonated polyethylene, polyvinylidene fluoride ("PVDF"), polypropylene, modified ethylene-chlorotrifluoroethylene, fluorinated ethylene propylene ("FEP"), ultraviolet resistant PVC, flame retardant PVC, low temperature oil resistant PVC, polyolefin, flame retardant polyurethane, flexible PVC, low smoke zero halogen ("LSZH") material, plastic, rubber, acrylic, or some other appropriate material known in the art, or a combination of suitable materials. As desired, the jacket 415 may also include flame retardant materials, smoke suppressant materials, carbon black or other suitable material for protection against exposure to ultraviolet ("UV") light, and/or other suitable additives. The jacket 415 may include a single layer or, alternatively, multiple layers of material (i.e., multiple layers of the same material, multiple layers of different materials, etc.). As desired, the jacket 415 may be characterized as an outer sheath, a casing, a circumferential cover, or a shell.

The jacket 415 may enclose one or more openings in which other components of the cable 400 are disposed. At least one opening enclosed by the jacket 415 may be referred to as a cable core, and any number of other cable components may be disposed in a cable core. In the cable 400 illustrated in FIG. 4, the CSM 405, the plurality of buffer tubes 410A-N and one or more optional components (e.g., strength members 440, an outer layer 420, etc.) may be situated within a cable core. A wide variety of other components may be situated within a cable core as desired, such as other transmission media, tight buffered optical fibers, various separators or dividers, spacers, inner jackets, etc. Indeed, a wide variety of different cable constructions may be utilized in accordance with various embodiments of the disclosure.

Additionally, the illustrated cable 400 has a circular or approximately circular cross-sectional profile. In other embodiments, other cross-sectional profiles (e.g., an elliptical or oval profile, etc.) and/or dimensions may be utilized as desired. In other words, the jacket 415 may be formed to result in any desired shape. The jacket 415 may also have a wide variety of dimensions, such as any suitable or desirable outer diameter and/or any suitable or desirable wall thickness. Additionally, in certain embodiments, the cable profile may be formed to facilitate a specific function and/or to facilitate installation of the cable. For example, a cable profile may facilitate clamping in aerial and/or other applications, etc., and the cable 400 may be designed to withstand a specified installation tensile loading and/or other suitable design parameters.

In certain embodiments, at least one "ripcord" may be incorporated into the cable 400, for example, within a cable core. A ripcord may facilitate separating the jacket 415 from other components of the cable 400. In other words, the ripcord may help open the cable 400 for installation or field service. A technician may pull the ripcord during installation in order to access internal components of the cable 400. A ripcord may be formed from a wide variety of suitable materials and/or with a wide variety of suitable dimensions.

In certain embodiments, one or more relatively rigid strength members (not shown) may be incorporated into the cable 400. For example, one or more strength rods may be embedded in the jacket 415. In certain embodiments, the jacket 415 may be formed or extruded around one or more strength members. Embedded strength members may be located at any desired points within the jacket 415. For example, strength members may be located on opposing lateral sides of a longitudinal axis of the cable 400. The strength members may enhance tensile strength of the cable 400. In other embodiments, one or more strength rods may be situated within a cable core. Indeed, a wide variety of strength member configurations may be utilized.

As desired, the cable 400 may be formed with a relatively small form factor, diameter, and/or cross-sectional area. In certain embodiments, the use of coaxial cable components 425A-G in the CSM 405 may provide enhanced tensile strength for the cable 400, thereby allowing other strength layers or components to be removed from the cable 400 or reduced in thickness or size. In this regard, an overall diameter or size of the cable 400 may be reduced.

The cable 400 illustrated in FIG. 4 is provided by way of example only. Embodiments of the disclosure contemplate a wide variety of other cables and cable constructions. These other cables may include more or less components than the cable 400 illustrated in FIG. 4. Additionally, certain components may have different dimensions and/or be formed from different materials than the components illustrated in FIG. 4.

Figure 5:
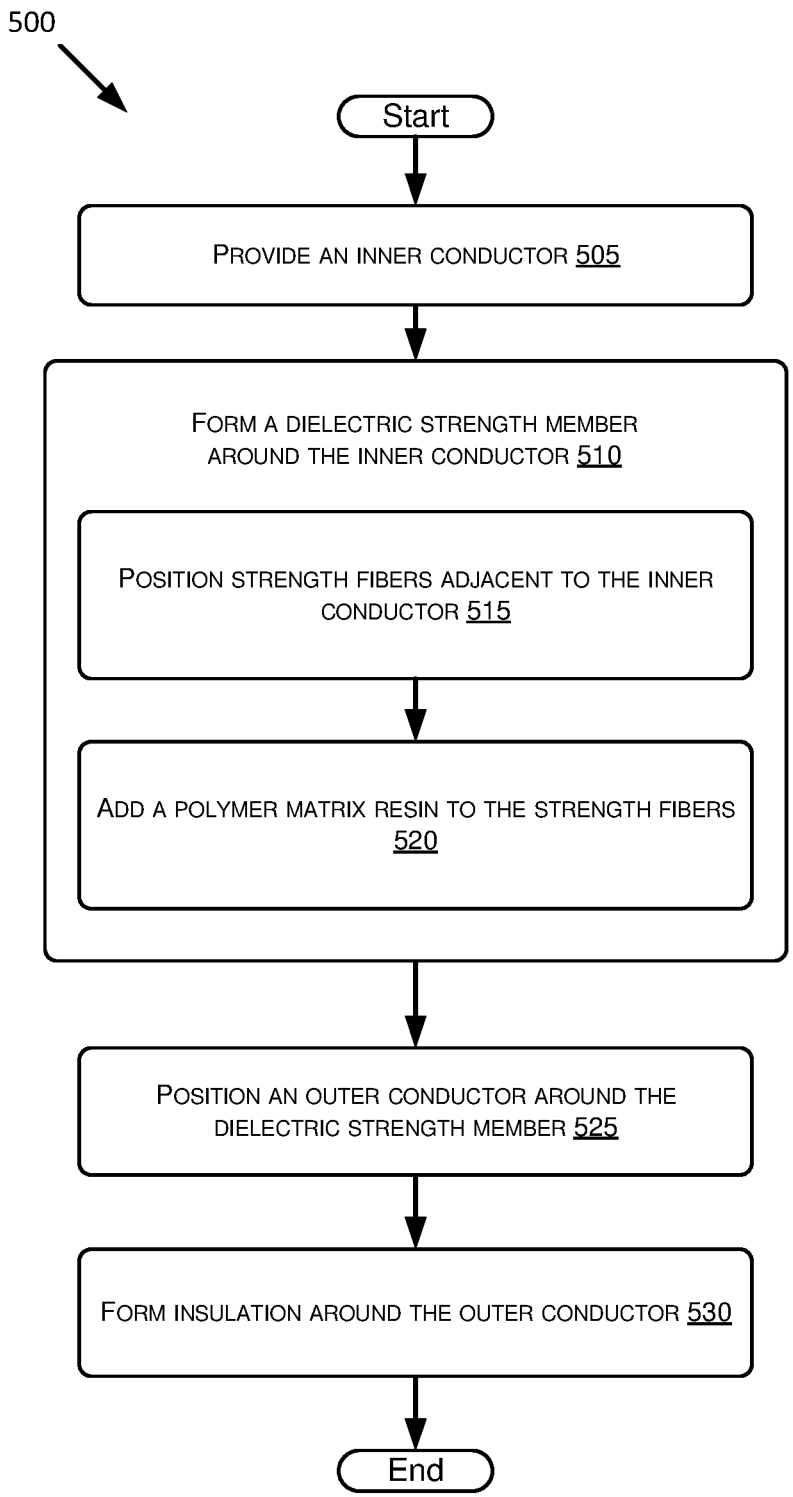
FIG. 5 depicts a flow chart of an example method for forming coaxial cables that incorporate dielectric strength members, according to an illustrative embodiment of the disclosure.

A wide variety of suitable methods and/or techniques may be utilized to form coaxial cables that incorporate dielectric strength members, such as any of the cables described in greater detail above with reference to FIGS. 1-3B. FIG. 5 depicts a flow chart of an example method 500 for forming coaxial cables that incorporate dielectric strength members, according to an illustrative embodiment of the disclosure. The method may begin at block 505, and an inner conductor may be provided. The inner conductor may be a solid conductor or a conductor that includes a plurality of twisted strands. In certain embodiments, an inner conductor may be formed, for example, by drawing input material through one or more appropriate dies. As another example, a plurality of conductive strands may be twisted or stranded together to form the inner conductor. In other embodiments, a preformed inner conductor may be provided.

Once an inner conductor is provided, operations may continue at block 510, and a dielectric strength member may be formed around the inner conductor. In certain embodiments, a plurality of strength fibers may be positioned adjacent to the inner conductor at block 515. A wide variety of suitable types of strength fibers, such as glass fibers or basalt fibers, may be positioned adjacent to the inner conductor as desired. In one example embodiment, a plurality of strength fibers may be twisted or stranded around the inner conductor. In another example embodiment, a plurality of strength fibers may be longitudinally positioned adjacent to the inner conductor. In yet another example embodiment, a plurality of strength fibers may be wrapped or curled around the inner conductor. As desired, strength fibers may be held in place using a wide variety of suitable techniques, such as adhesives, electrostatic cling, etc.

At block 520, one or more polymeric resin materials, such as a polymer matrix resin, may be applied on or over the strength fibers. A wide variety of suitable polymeric resins may be utilized as desired, such as epoxy, vinylester, polyester, polyurethane, and/or silicone. As a result of applying one or more resin materials, the strength fibers may be reinforced and held in place, thereby forming a dielectric strength member around the inner conductor. Additionally, a dielectric strength member may be formed with a wide variety of suitable tensile strengths, such as a tensile strength greater than 5,000 MPa, or a tensile strength between 5,000 MPa and 500 GPa.

At block 525, an outer conductor may be positioned around the dielectric strength member. In certain embodiments, conductive material may be wrapped or curled around the dielectric strength member. In other embodiments, a braided outer conductor may be wrapped or otherwise positioned around the dielectric strength member. In yet other embodiments, a plurality of conductive elements may be circumferentially positioned, twisted around, or otherwise arranged around the dielectric strength member in order to form an outer conductor. A wide variety of other suitable techniques may be utilized as desired to form or otherwise position an outer conductor around the dielectric strength member.

At block 530, insulation may be formed around the outer conductor. For example, a suitable jacket layer may be formed around the outer conductor. A wide variety of suitable materials and/or combinations of materials may be utilized to form insulation, such as any of the materials described above with reference to FIG. 1. Additionally, a wide variety of suitable methods or techniques may be utilized to form insulation as desired. For example, one or more suitable insulation materials may be extruded around the outer conductor.

In certain embodiments, the method may end following block 530. For example, the formed coaxial cable may be taken up on a suitable spool or reel. In other embodiments, the coaxial cable may be provided to one or more suitable downstream devices for additional processing. For example, the coaxial cable may be integrated into a larger cable, such as a suitable hybrid cable. In certain embodiments, the coaxial cable may be incorporated into a central strength member of a hybrid cable. In this regard, the coaxial cable may provide tensile support and/or anti-buckling support for a hybrid cable while also being capable of transmitting a suitable power signal and/or other signal.

As desired in various embodiments, the method 500 may include more or less operations than those described above with reference to FIG. 5. Additionally, in certain embodiments, any number of the described operations may be carried out or performed in parallel. The described method 500 is provided by way of non-limiting example only.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A cable comprising:
   an inner conductor;
   an outer conductor coaxially arranged around the inner conductor;
   a dielectric strength member positioned between the inner conductor and the outer conductor, the dielectric strength member having a thickness between 0.1 mm and 50 mm and a tensile strength between 5,000 MPa and 500 GPa;
   a jacket formed around the outer conductor.

2. The cable of claim 1, wherein the inner conductor and the outer conductor comprise a balanced pair of conductors.

3. The cable of claim 1, wherein the inner conductor has a first direct current resistance and the outer conductor has a second direct current resistance approximately equal to the first direct current resistance.

4. The cable of claim 1, wherein the dielectric strength member comprises glass reinforced plastic.

5. The cable of claim 1, wherein the dielectric strength member comprises basalt fiber.

6. The cable of claim 1, wherein the dielectric strength member defines a longitudinally extending cavity, and
   wherein the inner conductor is positioned within the cavity.

7. The cable of claim 1, wherein the dielectric strength member comprises a plurality of sections radially spaced around an outer periphery of the inner conductor.

8. The cable of claim 1, wherein the dielectric strength member is helically twisted around the inner conductor.

9. A cable, comprising:
   a dielectric strength member defining a longitudinally extending internal cavity, the dielectric strength member comprising a thickness between 0.1 mm and 50 mm and having tensile strength between 5,000 MPa and 500 GPa;
   an inner conductor positioned within the internal cavity;
   an outer conductor formed around the dielectric strength member; and
   a jacket formed around the outer conductor.

10. The cable of claim 9, wherein the inner conductor and the outer conductor comprise a balanced pair of conductors.

11. The cable of claim 9, wherein the dielectric strength member comprises glass reinforced plastic.

12. The cable of claim 9, wherein the dielectric strength member comprises basalt fiber.

13. The cable of claim 9, wherein the dielectric strength member comprises a plurality of sections radially spaced around an outer periphery of the inner conductor.

14. The cable of claim 9, wherein the dielectric strength member is helically twisted around the inner conductor.

15. A cable comprising:
   an inner conductor;
   an outer conductor coaxially arranged around the inner conductor, wherein a separation distance between the inner and outer conductors is between 0.1 mm and 50 mm;
   a dielectric strength member positioned between the inner conductor and the outer conductor, the dielectric strength member having a tensile strength between 5,000 MPa and 500 GPa and occupying between five percent and one hundred percent of the volume between the inner conductor and the outer conductor; and a jacket formed around the outer conductor.

16. The cable of claim 15, wherein the inner conductor and the outer conductor comprise a balanced pair of conductors.

17. The cable of claim 15, wherein the dielectric strength member comprises one of glass reinforced plastic or basalt fiber.

18. The cable of claim 15, wherein the dielectric strength member defines a longitudinally extending cavity, and
   wherein the inner conductor is positioned within the cavity.

19. The cable of claim 15, wherein the dielectric strength member comprises a plurality of sections radially spaced around an outer periphery of the inner conductor.

20. The cable of claim 15, wherein the dielectric strength member is helically twisted around the inner conductor.

* * * * *